United States Patent [19]

Miller et al.

[11] 4,330,839

[45] May 18, 1982

[54] PROGRAMMABLE CALCULATOR INCLUDING MEANS FOR AUTOMATICALLY PROCESSING IMFORMATION STORED ON A MAGNETIC RECORD MEMBER

[75] Inventors: Bradley W. Miller; Franklin T. Hickenlooper; David C. Uhlrich; Marl D. Godfrey; Douglas M. Clifford; Rex L. James; Robert E. Watson; John C. Keith; Allen C. Mortensen, all of Loveland, Colo.

[73] Assignee: Hewlett-Packard Company, Palo Alto, Calif.

[21] Appl. No.: 53,442

[22] Filed: Jun. 29, 1979

Related U.S. Application Data

[62] Division of Ser. No. 880,241, Feb. 22, 1978, abandoned, which is a division of Ser. No. 597,957, Jul. 21, 1975, Pat. No. 4,089,059.

[51] Int. Cl.³ ............................................. G06F 13/00
[52] U.S. Cl. ..................................... 364/706; 364/200
[58] Field of Search ................ 364/706, 709, 200, 900

[56] References Cited

U.S. PATENT DOCUMENTS

| | | | |
|---|---|---|---|
| 3,760,171 | 9/1973 | Wang et al. | 364/706 |
| 3,839,630 | 10/1974 | Olander, Jr. et al. | 364/706 |
| 4,009,379 | 2/1977 | Musch | 364/706 |
| 4,012,725 | 3/1977 | Spangler et al. | 364/706 |

*Primary Examiner*—David H. Malzahn
*Attorney, Agent, or Firm*—William E. Hein

[57] ABSTRACT

An adaptable programmable calculator employs modular read-write and read-only memories separately expandable to provide additional program and data storage functions within the calculator oriented toward the environment of the user, an LSI NMOS central processing unit, and LSI NMOS peripheral interface adaptor capable of bidirectionally transferring information between the read-write memory and central processing unit and a number of input/output units. The input/output units include a keyboard input unit with a plurality of alphanumeric keys, a magnetic tape cassette reading and recording unit capable of bidirectionally transferring programs and data between a magnetic tape and the calculator, a seven-segment gas discharge display, and a 16-column alphanumeric thermal printer. The calculator includes switch means for selecting an auto start mode of calculator operation whereby, upon the application of operating power to the calculator, a program stored on an external magnetic record member is automatically loaded into the calculator read-write memory and execution of that program is commenced.

3 Claims, 1 Drawing Figure

PROGRAMMABLE CALCULATOR INCLUDING MEANS FOR AUTOMATICALLY PROCESSING IMFORMATION STORED ON A MAGNETIC RECORD MEMBER

CROSS REFERENCE TO RELATED APPLICATION

This is a division of application Ser. No. 880,241, filed on Feb. 22, 1978, now abandoned, which is in turn a division of application Ser. No. 597,957, filed on July 21, 1975, now issued as U.S. Pat. No. 4,089,059. The subject matter of U.S. Pat. No. 4,089,059 is incorporated herein by reference.

BACKGROUND OF THE INVENTION

This invention relates generally to calculators and improvements therein and more particularly to programmable calculators that may be controlled both manually from the keyboard input unit and automatically by a stored program loaded into the calculator from the keyboard input unit or an external magnetic record member.

Computational problems may be solved manually, with the aid of a calculator (a dedicated computational keyboard-driven machine that may be either programmable or nonprogrammable) or a general purpose computer. Manual solution of computational problems is often very slow, so slow in many cases as to be an impractical, expensive, and ineffective use of the human resource, particularly when there are other alternatives for solution of the computational problems.

Nonprogrammable calculators may be employed to solve many relatively simple computational problems more efficiently than they could be solved by manual methods. However, the keyboard operations or language employed by these calculators is typically trivial in structure, thereby requiring many keyboard operations to solve more general arithmetic problems. Programmable calculators may be employed to solve many additional computational problems at rates hundreds of times faster than manual methods. However, the keyboard language employed by these calculators is also typically relatively simple in structure, thereby again requiring many keyboard operations to solve more general arithmetic problems.

Many programmable calculators constructed according to the prior art have employed step oriented memories and have handled memory transfer of conditional or unconditional transfer statements through the use of absolute step references. This technique leaves the user with sole responsibility for statement address modification in the event a transfer statement is edited, thus increasing the user's workload, as well as the chances for introduction of errors, during program editing operations. In addition, these prior art calculators rarely included language features useful in performing iterative looping functions encountered in programming complex problems.

These earlier step oriented calculators produced printed program listings that were very difficult to read because information syntactically representing a single statement was generated by several separate key actuations and then listed in a similar fashion with the information associated with each key being listed on a separate line.

Conventional programmable calculators are limited as to the complexity of the problems they are able to solve because of memory capacity limitations. Magnetic tape storage has been employed in some calculators to store program segments and data for use during execution of a program, thereby effectively increasing the size of the calculator read-write memory. These magnetic tape storage systems have been of limited usefulness, however, because of the relatively long access times involved.

Conventional programmable calculators in the low cost range have presented a communication problem for the user in that they typically have not employed output printers with fully formatted alphanumeric printing capabilities. It would be advantageous in calculators of this type to provide a low cost thermal printer, for example, that may be called upon by the user to print a variety of characters and numeric data according to a format designated by the user.

Conventional programmable calculators have been arranged to respond to power turn on by entering a standby mode, after which the user may enter a program from the keyboard or from a magnetic tape cassette, for example, for execution by the calculator. This arrangement is disadvantageous in that it requires of the user a considerable degree of knowledge regarding operation of the calculator. It would be advantageous to provide a programmable calculator that automatically responds to application of operating power by loading a program from an external magnetic record member into the calculator memory and by subsequently automatically initiating execution of that program.

SUMMARY OF THE INVENTION

The principal object of this invention is to provide an improved programmable calculator that has more capability and flexibility than conventional programmable calculators, that is smaller, less expensive, and more efficient in evaluating elementary mathematical functions than are conventional computer systems, and that is much easier for the untrained user to operate than either conventional programmable calculators or computer systems.

Another object of this invention is to provide a programmable calculator that employs a magnetic tape cassette unit for storing a program and in which the user may select an auto start mode of operation for automatically initializing the calculator, loading into calculator memory a program from the magnetic tape cassette unit, and executing that program, all in response to application of operating power by the user.

These objects are accomplished in accordance with the preferred embodiment of this invention by employing a keyboard input unit, a magnetic tape cassette reading and recording unit, a gas discharge output display unit, a 16-character thermal printer unit, a peripheral interface adaptor (PIA), a memory unit, and a central processing unit (CPU) to provide an adaptable programmable calculator having manual operating, automatic operating, program entering, magnetic tape reading, magnetic tape recording, and numeric display and alphanumeric print modes.

The keyboard input unit includes a group of numeric data keys for entering data into the calculator, a group of data manipulation keys, a group of function keys for selecting various mathematical functions and operators, a group of memory control keys for controlling the program and data storage areas of the calculator memory, another group of control keys for controlling the operation of the magnetic tape cassette reading and recording unit, and a group of user-definable keys. Many of these groups of keys are useful in both the manual and programmable operating modes. In addition, each of the keys of the user-definable group assumes a secondary meaning during program entry to automatically provide functions that are unnecessary when executing commands manually from the keyboard.

The magnetic tape cassette reading and recording unit includes a reading and recording head, a drive mechanism for driving a magnetic tape past the reading and recording head, and reading and recording drive circuits coupled to the reading and recording head for bidirectionally transferring information between the magnetic tape and the calculator as determined by keyboard commands or commands which are part of a stored program.

The memory unit includes a modular random-access read-write memory having a dedicated system area and a separate user area for storing program statements and/or data. The user portion of the read-write memory may be expanded without increasing the overall dimensions of the calculator by the addition of a read-write memory module. Additional read-write memory made available to the user is automatically accommodated by the calculator, and the user is automatically informed of the number of available program storage locations and when the storage capacity of the read-write memory has been exceeded.

The memory unit also includes a modular read-only memory in which routines and subroutines of assembly language instructions for performing the various functions of the calculator are stored. The routines and subroutines stored in the read-only memory may be expanded to provide routines required to interface various peripheral input/output units to the calculator and to provide some additional functions oriented toward the specific needs of the user. This is accomplished by simply plugging additional read-only memory modules (ROMs) into either or both of two receptacles provided in the rear panel of the calculator housing. Added read-only memory modules are automatically accommodated by the calculator and are accessed by the calculator through a series of select codes.

Plug-in ROMs include, for example, a plotter ROM, a typewriter control ROM, a general input/output ROM, a binary-coded-decimal input/output ROM, and an ASCII bus interface ROM. Additional read-only memory modules may be added to a printed circuit board inside the calculator to allow printing characters of foreign languages on both the 16-character thermal printer unit and on an output typewriter that has the desired foreign language character set.

The gas discharge output display unit features 16-character seven segment numeric output with a minus sign, a decimal point, and the capability of displaying commas in selected locations within displayed data.

The 16-character thermal printer unit can print out messages to the user such as error conditions, listings of the user's program and any other message selected by the user that may be formed from the character set available in the calculator. Some alphanumeric data formatting can also be accomplished in the printed output of a single line of information.

The peripheral interface adaptor (PIA) may comprise, for example, a Motorola MC6820 PIA. The PIA operates in conjunction with the central processing unit of the calculator and is capable and is capable of dual 8-bit parallel input/output with associated flag, control, handshake, and interrupt hardware that enables the calculator central processing unit to communicate with the above-mentioned internal input/output units that include the keyboard, printer, display, and magnetic tape cassette units. The PIA also has the capability of enabling the calculator to communicate with a plurality of external or peripheral input/output units such as paper tape readers and punches, X-Y plotters, typewriters, and various types of measurement and data gathering instrumentation. This external input-output capability is available to the user through either or both of two input/output connectors located on the rear panel of the calculator that connect the external input/output unit to the PIA through some input/output interface circuitry.

The central processing unit (CPU) may comprise, for example, a Motorola MC6800 8-bit parallel processor with a 1-megahertz clock rate and 65K addressability. This processor includes two 8-bit accumulators, a 16-bit index register, a 16-bit stack pointer, and a 6-bit condition code register.

In the run mode of operation, the calculator is controlled by keycodes received sequentially from the keyboard input unit resulting from key actuations by the user. These keycodes are examined within the calculator immediately upon receipt from the keyboard input unit and are checked for proper syntactical meaning as required by the calculator language. An internal instruction code is generated by the calculator from these keycodes to represent the keyboard instruction desired by the user. This instruction code is then used as a pointer to the address of the routine stored in the read-only memory that is responsible for the execution of the selected instruction.

In the program mode of operation the internal instruction codes generated by the calculator during program entry are stored in the program storage area of the user read-write memory at an address specified by the current value of a user program pointer. These stored instructions constitute a program that may be automatically executed upon request by the user. During program entry, the output printer may be commanded, by means of a keyboard switch, to provide a printed listing of the keyboard commands selected by the user together with the corresponding program address at which the associated internal instruction code is stored. Since several key actuations may result in generation by the calculator of a single internal instruction code and since the calculator executes only these internal instruction codes, a complex stored program can be executed by the calculator very efficiently and in a short period of time.

An autostart mode of operation may be switchably selected by the user to automatically enter into the calculator and execute a program stored on a magnetic tape. This feature allows the use of the calculator by persons unfamiliar with the details of its operation and provides a means for restoring the calculator to working condition in the event a power failure occurs at a time when the calculator is unattended by the user or is attended by an unskilled user.

DESCRIPTION OF THE PREFERRED EMBODIMENT

GENERAL DESCRIPTION

Figure 1:
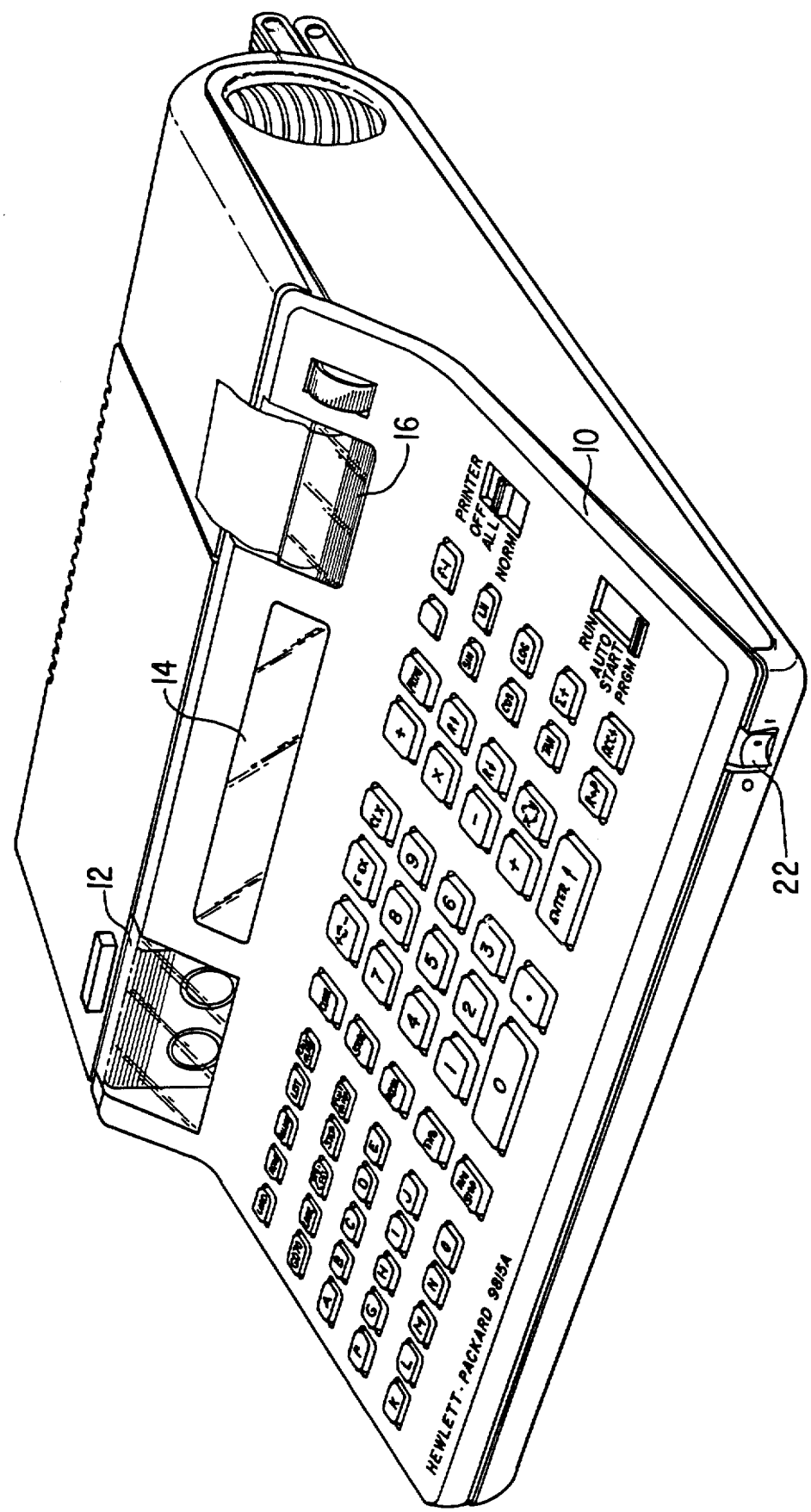
FIG. 1 is a front perspective view of a programmable calculator according to the preferred embodiment of this invention.

Referring to FIG. 1, there is shown a programmable calculator including both a keyboard 10 for entering information into the calculator and for controlling the operation of the calculator and a magnetic tape cassette reading and recording unit 12 for recording information stored within the calculator onto one or more external tape cartridges and for loading information stored on these magnetic tape cartridges back into the calculator. The calculator also includes a seven-segment gas discharge display for displaying data entered into the calculator, the results of computations, and selected alphanumeric messages. The calculator further includes a 16-column alphanumeric thermal printer 16 for printing computation results, program listings, messages generated by the calculator system and the user, and error conditions encountered during use of the calculator. All of these input/output (I/O) units are included within the calculator itself.

CALCULATOR OPERATION

GENERAL DESCRIPTION

All operations performed by the calculator may be controlled or initiated by the keyboard input unit and/or by keycodes entered into the calculator from the keyboard input unit, the magnetic tape cassette unit, or peripheral I/O units and stored, in modified form, as program steps in the program storage section of the read-write memory. An operational description of the calculator is therefore now set forth with specific reference to the perspective view of the calculator as shown in FIG. 1.

The calculator employs reverse polish notation (RPN) language that involves the use of an operational stack of four registers referred to herein as the X, Y, Z, and T registers. Simple arithmetic operations are performed by placing data in the X and Y registers and then actuating one of the arithmetic operator keys. The calculated result is placed in the X register.

The 16-character display 14 shows each number entered from the keyboard 10 and each calculated result. The 16-column thermal printer 16 can be called upon to print the data currently displayed. In addition, the display 14 and printer 16 are valuable programming aids.

The dynamic range of the calculator is from $-9.999999999 \times 10^{99}$ through $9.999999999 \times 10^{99}$. When a calculated result lies outside this range, the message OVERFLOW is printed. All calculations are to twelve places, but the accuracy depends upon the function performed. Ordinary arithmetic functions are accurate to one count in the 12th digit.

In addition to the four working registers X, Y, Z, and T comprising the operational stack, the basic calculator includes ten permanent data storage registers and a 472-step program memory. The program memory may be expanded to 2008 program steps by adding read-write memory to the calculator, as discussed hereinabove. Additional data storage registers may be assigned by the user when needed.

The calculator may be operated by means of a program stored on an external magnetic tape cartridge placed into the magnetic tape cassette reading and recording unit 12. External magnetic tape cartridges can store either pre-recorded factory programs or programs written by the user.

By inserting optional plug-in I/O ROMs into one or both of the slots provided therefor on the rear panel of the calculator, the calculator may be interfaced to one or more peripheral I/O units. These include, for example, the Hewlett-Packard 9862A X-Y Plotter, the Hewlett-Packard 9863A Paper Tape Reader, the Hewlett-Packard 9884A Paper Tape Punch, the Hewlett-Packard 9864A Digitizer, and the Hewlett-Packard 9866A Page Printer. In addition, the calculator may be interfaced to most BCD-compatible instrumentation and, through the use of a universal interface bus manufactured by Hewlett-Packard Company, to nearly all bus-compatible instrumentation.

TAPE OPERATIONS

The magnetic tape cassette unit 12 built into the calculator allows the user to make permanent records on an external magnetic tape cartridge of his programs and data blocks. Each such program or data block may be subsequently read back into the calculator memory as often as desired. Five keys, all programmable, for controlling the operation of magnetic tape cassette unit 12 are provided on the left-hand portion of keyboard 10. Their primary functions are labelled LOAD, REWIND, RECORD, LIST, and L. Each external tape cartridge has capacity for about 96,000 program steps or the contents of about 12,000 data storage registers. A RECORD slide located on each tape cartridge may be positioned to prevent accidental erasure of information stored on a cartridge by inhibiting execution of a RECORD instruction.

The magnetic tape cassette unit routinely checks to insure that all the information being loaded into the calculator memory from an external tape cartridge corresponds exactly to the information originally recorded. If an error is detected during a data loading or program loading operation, an attempted reloading is made. If the information cannot be successfully loaded after three such automatic attempts, the loading operation is halted and an error message CHECKSUM ERROR is printed. Typical causes for such an error are badly worn or partially erased tapes or a dirty tape head.

Before programs or data can be recorded onto a blank tape cartridge, the cartridge must be initialized by performing one or more MARK TAPE instructions. Each MARK TAPE instruction records a block of empty files onto one track of the tape. Two tracks are available on each tape cartridge, and each track may be initialized and used for information storage and retrieval independent of the other. A primary track may be used by specifying a positive file number in each tape instruction. A secondary track may similarly be used by specifying a negative file number. A blank area is associated with the beginning of each file to serve as a file separator. A file identifier includes information relating to a particular file such as a file number, a file type, an absolute file size, a current file size, etc. A portion of each tape file called the file body is used for actual program or data storage. The absolute file size specified in the MARK TAPE instruction determines the size of this file body.

Each MARK TAPE instruction, entered by sequentially actuating the BLANK key and the MARK key, initializes one track of a tape cartridge by storing a block of empty files together with appropriate file identifiers. The integer portion of numbers stored in the Z, Y, and X registers specifies, respectively, the size of each file, the number of files in the block, and the number designator for the first file. The size of each file is expressed in program steps. To determine the file size in program steps needed to hold a desired number of data storage registers, the number of data storage registers is merely multiplied by eight.

After the specified number of files has been marked, an extra file is automatically marked, and the tape is positioned in front of the extra file. The extra file is marked to facilitate marking additional files at a later time and hence has no file body. Programs or data may now be stored in each file marked, or more files may be marked beginning with the extra file. Files are marked and designated in numerical order, beginning with file $\phi$ for files marked on the primary track or file $-\phi$ for files marked on the secondary track.

The MARK TAPE instruction has the same format for both new and used tape cartridges. However, when marking files on a used tape, it is important to mark over, or erase, all old files. This will prevent unexpected results. Old files may be erased by simply marking new files in sufficient quantity or sufficient size to extend beyond the old files. Or, they may be erased by specifying a negative number of files in any MARK TAPE instruction. For example, if -1 is stored in the Y register at the time a MARK TAPE instruction is executed, a single file will be marked and the remainder of the specified track will automatically be erased.

An IDENTIFY instruction, entered by sequentially actuating the BLANK key and the IDENT key, transfers the file identifier information associated with a designated file into the registers of the operational stack. The number of the desired file is stored in the X register prior to execution of the instruction. Following execution of the instruction, a number corresponding to the file type is stored in the T register, the number of steps in use is stored in the Z register, the originally marked file size is stored in the Y register, and, of course, the file number remains stored in the X register. The various file types and their corresponding number designators are shown in Table 4 below.

TABLE 4

| | |
|---|---|
| $\phi$ | PROGRAM FILE |
| 1 | SECURED PROGRAM |
| 2 | DATA FILE |
| 3 | PRE-RECORDED FACTORY PROGRAM |
| 4 | SECURED PRE-RECORED FACTORY PROGRAM |
| 5 | EMPTY FILE |
| 6 | EXTRA FILE |

For the user's convenience, the contents of the four registers of the operational stack together with the alpha labels FILE, TYPE, USED, and MAX are automatically printed when an IDENTIFY instruction is executed from the keyboard.

Execution of a RECORD instruction, entered by actuating the RECORD key, records the contents of the program storage portion of user read-write memory, from a current step location through an END instruction, on a designated tape file. In no END instruction is encountered, the remainder of the program storage portion of user read-write memory is recorded. Before execution of the instruction, the desired beginning step location should be stored in the Y register, and the number of the desired file should be stored in the X register. If the designated file is too small or the tape is protected, the RECORD instruction is cancelled, and an error message is printed.

Execution of a LOAD instruction, entered by actuating the LOAD key, loads programs or data from a desired tape file into the user read-write memory. The file type determines whether programs or data will be loaded. Before execution of a LOAD instruction, the desired beginning step location in memory should be stored in the Y register, and the number of the desired tape file should be stored in the X register. If the file is of the wrong type or there is not enough read-write memory available, the LOAD instruction is cancelled, and an error message is printed.

A LOAD & GO instruction, entered by actuating the LD & GO key, provides a programmable method for automatically loading and executing a specified program. Before execution of the instruction, the beginning step location in memory should be stored in the Y register, and the number of the desired file should be stored in the X register. An extremely long program may be separated into segments, each segment being recorded into a separate tape file. A LOAD & GO instruction may be added to the end of each program segment to automatically call and execute the program segments in succession.

Execution of a RECORD DATA instruction, entered by sequentially actuating the BLANK and RECORD keys, records the contents of a block of numbered data storage registers into a specified tape file. Before execution of the instruction, the number of data storage registers to be recorded should be stored in the Z register, the first register number should be stored in the Y register, and the file number should be stored in the X register. If the specified registers have not previously been assigned, if the file is too small or of the wrong type, or if the tape is protected, the RECORD DATA instruction is cancelled, and a error message is printed.

As stated above, the LOAD instruction is used for loading both data and programs into the calculator. The file type determines whether programs or data will be loaded. Before loading data, the starting data storage register number should be stored in the Y register, and the file number should be stored in the X register. The data is loaded, register-by-register, beginning with the starting register. If the file is of the wrong type or if an insufficient number of data storage registers has been assigned, the instruction is cancelled, and an error message is printed.

Execution of a VERIFY instruction, entered by sequential actuation of the BLANK and VERIFY keys, compares the information recorded on a tape file with the program or data presently stored in the calculator memory. To verify a program file, the starting step location should be stored in the Y register and the file number should be stored in the X register. To verify a data file, the number of the data storage register should be stored in the Y register and the file number should be stored in the X register. The VERIFY instruction is most easily executed directly after a loading or recording operation, since the proper numbers are already stored in the X and Y registers. If the information in the file is not identical to that stored in the user read-write memory, one of the error messages VERIFY FAILED or CHECKSUM ERROR is printed. Neither of these two errors will cause program execution to halt when flag 6 is set. In that case, program flag 5 is automatically set by either error.

A RECORD SECURED instruction, entered by sequentially actuating the CALL and RECORD keys, provides a method for recording private programming on tape. Execution of the instruction records a program into a specified file, like the RECORD PROGRAM instruction, except that the file type is designated as type 1. Before execution of the instruction, the starting step location should be stored in the Y register, and the number of the desired file should be stored in the X register. Execution of the RECORD SECURED instruction does not affect the contents of memory. A secured program can be loaded back into the calculator just as any other program and then executed in the normal manner. However, once a secured program has been loaded into the calculator, any attempt to list, record, or edit the program will result in the error message SECURED MEMORY being printed. When a secured program has been loaded into the calculator memory, all other programs stored in the memory are automatically secured. Data storage registers, however, are not affected. The secured memory may be cleared by erasing the memory or by turning the calculator off.

An AUTOSTART mode of calculator operation is provided to automatically load a program stored in tape file $\phi$ into the calculator memory and initiate execution of that program, all in response to placing the calculator power switch 22 in the ON position. The AUTOSTART mode of operation is selected by positioning the calculator mode switch located in the lower right-hand corner of the keyboard in the AUTOSTART position. This switch is interrogated by the calculator firmware. If the switch is found to be in the AUTOSTART position, the tape is searched for file $\phi$ and the file type is interrogated. If file $\phi$ is of type $\phi$ or 1, the file is automatically loaded into the calculator memory and execution is initiated at step location 0000. If any errors occur during loading of this file, the AUTOSTART mode is cancelled, an error message is printed, and the calculator is returned to the RUN mode. The AUTOSTART mode is advantageous in that it provides automatic memory definition without intervention on the part of a possibly unskilled user. In addition, it provides automatic resumption of execution of a program after restoration of operating power following, for example, a power blackout.

We claim:

1. An electronic calculator comprising:
   keyboard input means for entering information into the calculator;
   memory means, coupled to said keyboard input means, for storing information entered into the calculator from said keyboard input means;
   processing means, coupled to said keyboard input means and memory means, for processing information stored in said memory means;
   magnetic reading and recording means, coupled to said processing means, and including a magnetic record member, for tranferring information between said memory means and said magnetic record member;
   mode selection means for enabling the operator to select an auto start mode of calculator operation; and
   power switching means for enabling the operator to apply operating power to the calculator;
   said processing means including logic means responsive to selection of the auto start mode of calculator operation and to actuation of said power switching means applying operating power to the calculator for initiating processing by said processing means of information stored on a magnetic record member.

2. An electronic calculator as in claim 1 wherein:
   said memory means stores a program of instructions entered into the calculator;
   said processing means is operative for executing a program of instructions stored in said memory means;
   said magnetic reading and recording means is operative for loading a program of instructions stored on a magnetic record member into said memory means; and
   said logic means is responsive to actuation of said power switching means applying operating power to the calculator, following selection of the auto start mode of calculator operation, for causing said magnetic reading and recording means to load a program of instructions stored on a magnetic record member into said memory means and for immediately initiating execution of that program by said processing means.

3. An electronic calculator as in claim 2 further comprising:
   display means, coupled to said processing means, for visually indicating selected alphanumeric messages, including error messages, to the operator; and wherein
   said logic means includes error detection means for detecting syntactical errors in a program of instructions as that program of instructions is loaded from a magnetic record member into said memory means, said error detection means including error detection control means, responsive to detection of a syntactical error in a program of instructions being loaded into said memory means, for causing said display means to visually display an alphanumeric error message indicative of the detected error and for preventing said logic means from responding to a previously selected auto start mode of calculator operation.

* * * * *

UNITED STATES PATENT AND TRADEMARK OFFICE
CERTIFICATE OF CORRECTION

PATENT NO. : 4,330,839

DATED : May 18, 1982

INVENTOR(S) : Bradley W. Miller et al

It is certified that error appears in the above—identified patent and that said Letters Patent is hereby corrected as shown below:

Column 4, line 1, delete first occurrence "and is capable";

Column 7, line 62, "In" should be --If--.

Signed and Sealed this

Twenty-eighth Day of December 1982

[SEAL]

Attest:

GERALD J. MOSSINGHOFF

Attesting Officer     Commissioner of Patents and Trademarks